United States Patent
Veeragandham et al.

(10) Patent No.: US 7,978,609 B2
(45) Date of Patent: *Jul. 12, 2011

(54) SYSTEMS AND METHODS FOR IMPROVING PACKET SCHEDULING ACCURACY

(75) Inventors: Sreeram Veeragandham, Ann Arbor, MI (US); Rami Rahim, Sunnyvale, CA (US); Song Zhang, San Jose, CA (US); Anurag P. Gupta, Saratoga, CA (US); Jorge Cruz-Rios, Los Altos, CA (US); Jayabharat Boddu, Los Altos, CA (US); Jeffrey R. Zimmer, Scotts Valley, CA (US); Jia-Chang Wang, Saratoga, CA (US); Srihari Shoroff, Fremont, CA (US); Chi-Chung K. Chen, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/470,627

(22) Filed: May 22, 2009

(65) Prior Publication Data

US 2009/0245246 A1    Oct. 1, 2009

Related U.S. Application Data

(63) Continuation of application No. 10/863,772, filed on Jun. 9, 2004, now Pat. No. 7,554,919.

(51) Int. Cl.
*H04L 1/00* (2006.01)
(52) U.S. Cl. .................................. 370/236; 370/470
(58) Field of Classification Search .................. None
See application file for complete search history.

(56) References Cited

U.S. PATENT DOCUMENTS

| 6,470,016 | B1 | 10/2002 | Kalkunte et al. |
| 7,554,919 | B1* | 6/2009 | Veeragandham et al. ..... 370/236 |
| 2002/0136230 | A1 | 9/2002 | Dell et al. |
| 2003/0005103 | A1 | 1/2003 | Narad et al. |
| 2003/0009560 | A1 | 1/2003 | Venkitaraman et al. |
| 2003/0021295 | A1 | 1/2003 | Sahinoglu et al. |
| 2003/0179777 | A1 | 9/2003 | Denton et al. |
| 2004/0095901 | A1 | 5/2004 | Rajkotia |
| 2004/0264450 | A1 | 12/2004 | Schrodi |
| 2005/0243847 | A1 | 11/2005 | Bitar et al. |
| 2010/0074153 | A1* | 3/2010 | Torsner et al. ................. 370/280 |

OTHER PUBLICATIONS

Co-pending U.S. Appl. No. 10/863,772, filed Jun. 9, 2004; Sreeram Veeragandham et al., entitled "Systems and Methods for Improving Packet Scheduling Accuracy".
E. Rosen et al., "Multiprotocol Label Switching Architecture" www.ietf.org/rfc/rfc3031.txt?number=3031 , Jan. 2001, 55 pp.
James Aweya, "IP Router Architectures: An Overview" Nortel Networks; Ottawa, Canada 1999, 48 pp.

(Continued)

*Primary Examiner* — Jianye Wu
(74) *Attorney, Agent, or Firm* — Harrity & Harrity, LLP

(57) ABSTRACT

A packet scheduler is configured to perform quality of service (QoS) scheduling on a per-data unit basis. A downstream processing engine is operatively connected to the packet scheduler for receiving forwarded packets. A feedback path is operatively connected between the downstream processing engine and the packet scheduler for transmitting a net data unit change value reflecting a change in packet size between an output of the packet scheduler and an output of the downstream processing engine.

20 Claims, 8 Drawing Sheets

OTHER PUBLICATIONS

Peter Ashwood-Smith et al., "So What is MPLS?" Nortel Networks, www.nanog.org/mtg-9905/ppt/mpls/index.htm , Oct. 1999, 39 pp.

"Operation of a Router", www.erg.abdn.ac.uk/users/gorry/course/inet-pages/router-opn.html , Mar. 3, 2004 (print date), 11 pp.

Jeff Wabik, "QoS 101: Overview of Packet Scheduling", Ascend Communications, Multi-Gigabit Routing Division, Jun. 9, 2004 (print date), 26 pp.

* cited by examiner

SYSTEMS AND METHODS FOR IMPROVING PACKET SCHEDULING ACCURACY

RELATED APPLICATION

This application is a continuation of U.S. patent application Ser. No. 10/863,772, filed Jun. 9, 2004, which is incorporated herein by reference.

BACKGROUND OF THE INVENTION

A. Field of the Invention

Systems and methods consistent with principles of the invention relate generally to packet scheduling, and more particularly, to improving the accuracy of packet scheduling systems.

B. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at the required line rate when the new functionality was enabled.

To meet the new demands, purpose-built routers were designed. Purpose-built routers are designed and built with components optimized for routing. They not only handle higher line rates and higher network traffic volume, but they also add functionality without compromising line rate performance.

A purpose-built router may include a number of input and output ports from which it transmits and receives information packets. A switching fabric may be implemented in the router to carry the packets between ports.

In order to control their high packet throughput, purpose-built routers use memory buffers to temporarily queue packets waiting to be processed based upon predefined criteria, such as relative weight or priority. A packet scheduler may control the dequeuing of packets from the buffer queues. One well-known scheduling methodology is referred to as Weighted Round Robin (R) scheduling. In WRR scheduling, each queue is assigned a relative weight. Transmission opportunities are allocated for each queue based upon the relative weights of the queues, using a round-robin technique to cycle between the queues.

While weighted round robin scheduling provides fairly accurate allocation of resources, processing that may occur after the WRR scheduler has performed its operation may modify the packets actually transmitted. Such modifications may reduce the accuracy of the WRR scheduler. Accordingly, there is a need for a WRR scheduler that more accurately takes output packet size into consideration.

SUMMARY OF THE INVENTION

Systems and methods consistent with principles of the invention address this and other needs by providing a network device that enables more accurate quality of service (QoS) packet scheduling. In one implementation, a feedback path is provided between a packet scheduler and a downstream processing engine. In response to variances in packet length output at the packet scheduler and the downstream processing engine, credit counters at the packet scheduler may be modified to accurately account for downstream processing effects.

One aspect consistent with principles of the invention is directed to a system for scheduling data units in a network device. The system includes a packet scheduler configured to perform quality of service scheduling on a per-data unit basis. Additionally, a downstream processing engine is operatively connected to the packet scheduler for receiving forwarded packets. A feedback path is provided between the downstream processing engine and the packet scheduler for transmitting a net data unit change value reflecting changed packet size between an output of the packet scheduler and an output of the downstream processing engine.

A second aspect consistent with principles of the invention is directed toward a method for transmitting data units on an output link of a network device. Initially, a downstream processing engine receives a packet from a packet scheduler, the packet having an initial packet length. A credit counter associated with the output queue from which the packet originated is decremented by the initial packet length. Downstream processing is performed on the packet to create a processed packet. A net data unit change value is calculated reflecting changed packet size between an output of the packet scheduler and an output of the downstream processing engine. The net data unit change value is transmitted from the downstream processing engine to the packet scheduler. The credit counter associated with the output queue is then modified by the net data unit change value.

A third aspect consistent with principles of the invention is directed to a system for scheduling data units in a network device. The system includes means for performing quality of service scheduling of packets originating from a set of output queues on a per-byte unit basis, means for receiving a packet, the packet having an initial packet length, and means for decrementing a credit counter associated with an output queue from which the packet originated by the initial packet length. Additionally, the system includes means for processing packets received from the scheduling means, means for transmitting a net data unit change value reflecting changed packet size between an output of the scheduling means and the processing means, and means for modifying the credit counter associated with the output queue by the net data unit change value.

A fourth aspect consistent with principles of the invention is directed to a method for scheduling and transmitting packets in a network device. The method includes identifying a QoS queue $Q_x$ having packet forwarding priority. A packet is forwarded to a downstream processing engine having a byte length PLEN[x] from $Q_x$. A credit counter CCNT[x] associated with $Q_x$ is decremented such that CCNT[x]=CCNT[x]−PLEN[x]. The packet is processed by the downstream processing engine in a manner resulting in a net packet length change. A net packet length change value RS_ADJUST_PLEN[x] is calculated and the credit counter CCNT[x] associated with $Q_x$ is modified such that CCNT[x]=CCNT[x]−RS_ADJUST_PLEN[x].

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a packet scheduler identifies packets from transmit queues for transmission on an output port or "wire". Subsequent processing following packet selection, such as encapsulation, fragmentation, etc. may result in the addition to or removal of bytes from an actually transmitted packet.

System Overview

Figure 1:
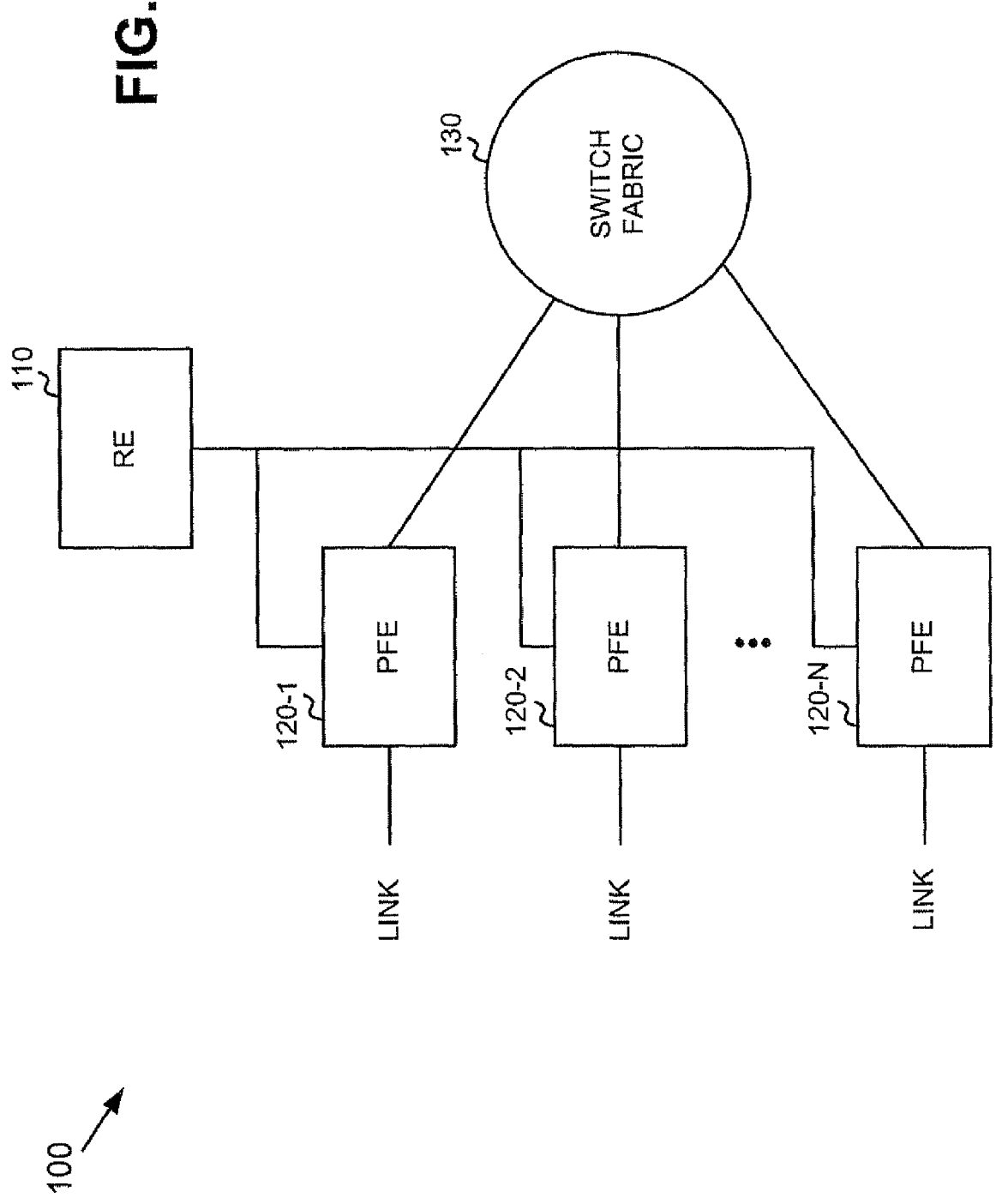
FIG. 1 is a block diagram illustrating an exemplary routing system in which systems and methods consistent with the principles of the invention may be implemented.

FIG. 1 is a block diagram illustrating an exemplary routing system 100 in which systems and methods consistent with the principles of the invention may be implemented. System 100 receives one or more packet streams from a physical link, processes the packet stream(s) to determine destination information, and transmits the packet stream(s) out on a link in accordance with the destination information. System 100 may include a routing engine (RE) 110, packet forwarding engines (PFEs) 120-1 through 120-N (collectively referred to as PFEs 120), and a switch fabric 130.

RE 110 performs high level management functions for system 100. For example, RE 110 communicates with other networks and systems connected to system 100 to exchange information regarding network topology. RE 110 creates routing tables based on network topology information, creates forwarding tables based on the routing tables, and forwards the forwarding tables to PFEs 120. PFEs 120 use the forwarding tables to perform route lookup for incoming packets. RE 110 also performs other general control and monitoring functions for system 100.

PFEs 120 are each connected to RE 110 and switch fabric 130. PFEs 120 receive packet data on physical links connected to a network, such as a wide area network (WAN) or a local area network (LAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

A PFE 120 may process incoming packet data prior to transmitting the data to another PFE or the network. For example, in one embodiment, the data remaining after the data link layer is stripped off is packets. PFE 104 may include layer 2 (L2) and layer 3 (L3) packet header information, control information regarding the packets, and the packet payload data in a series of D cells. In one embodiment, the L2, L3, and the control information are stored in the first two cells of the series of cells. The packet's payload data may also be stored as a series of cells.

PFE 120 may also perform a route lookup for the data using the forwarding table from RE 110 to determine destination information. If the destination indicates that the data should be sent out on a physical link connected to PFE 120, then PFE 120 prepares the data for transmission by, for example, adding any necessary headers, and transmits the data from the port associated with the physical link. If the destination indicates that the data should be sent to another PFE via switch fabric 130, then PFE 120 prepares the data for transmission to the other PFE, if necessary, and sends the data to the other PFE via switch fabric 130.

PFEs 120 form data structures called notifications based on the L2, L3, and control information, and perform route lookups using the notification and the routing table from RE 110 to determine destination information. PFEs 120 may also further process the notification to perform protocol-specific functions, policing, and accounting, and might even modify the notification to form a new notification.

If the determined destination indicates that the packet should be sent out on a physical link connected to one of PFEs 120, then PFE 120 retrieves the cells for the packet, converts the notification or new notification into header information, forms a packet using the packet payload data from the cells and the header information, and transmits the packet from the port associated with the physical link.

If the destination indicates that the packet should be sent to another PFE via switch fabric 130, then the PFE 120 retrieves the cells for the packet, modifies the first two cells with the new notification and new control information, if necessary, and sends the cells to the other PFE via switch fabric 130. Before transmitting the cells over switch fabric 130, PFE 120 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, in one implementation, RE 110, PFEs 120, and switch fabric 130 perform routing based on packet-level processing. PFEs 120 store each packet in cells while performing a route lookup using a notification, which is based on packet header information. A packet might be received on one PFE and go back out to the network on the same PFE, or be sent through switch fabric 130 to be sent out to the network on a different PFE.

Figure 2:
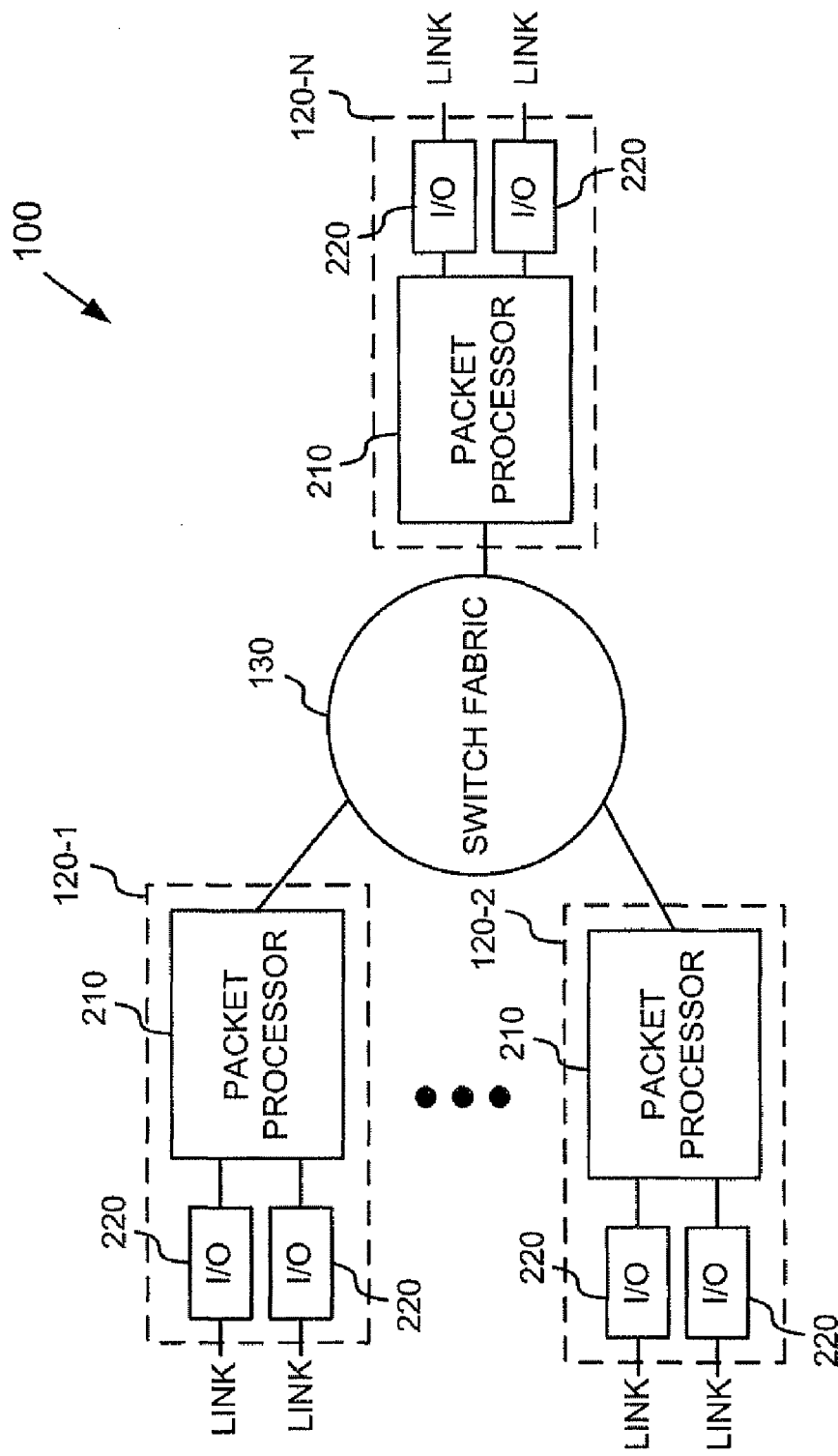
FIG. 2 is a detailed block diagram illustrating portions of the routing system shown in FIG. 1.

FIG. 2 is a detailed block diagram illustrating portions of routing system 100. PFEs 120 connect to one another through switch fabric 130. Each of PFEs 120 may include one or more packet processors 210 and input/output (I/O) interfaces 220. Although FIG. 2 shows two I/Os 220 connected to each of packet processors 210 and three packet processors 210 connected to switch fabric 130, in other embodiments consistent with principles of the invention there can be more or fewer I/Os 220 and packet processors 210.

Each of packet processors 210 performs routing functions and handle packet transfers to and from I/Os 220 and switch fabric 130. For each packet it handles, a packet processor 210 performs the previously-discussed route lookup function and may perform other processing-related functions, discussed in additional detail below.

I/Os 220 may transmit data between a physical link and packet processor 210. In one implementation, each of I/Os 220 may be a physical interface card (PIC). Different I/Os 220 may be designed to handle different types of network links. For example, one of I/Os 220 may be an interface for an optical link while another of I/Os 220 may be an interface for an Ethernet link, implementing any of a number of well-known protocols.

For incoming data, in one embodiment, I/Os 220 may strip off the layer 1 (L1) protocol information and forward the remaining data, such as raw packets, to packet processor 210. For outgoing data, I/Os 220 may receive packets from packet processor 210, encapsulate the packets in L1 protocol information, and transmit the data on the physical link or "wire".

Exemplary Configuration

As noted above, packet processors 210 generate notifications for received packets. The notifications may include a reference to the actual packet data stored in memory and the appropriate outgoing interface (e.g., an outgoing port on one of I/Os 220) associated with the packet. The notifications may then be stored in queues corresponding to the outgoing interface. For the sake of simplicity, notifications referencing packet data are referred to herein as packets themselves. In one implementation, the queues may be first-in-first-out (FIFO) queues, where the oldest packets in the queue are the first to be output. Additionally, queues may also be established and populated by packet processors 210 based upon a Quality of Service (QoS) classification. In this manner, packets having pre-defined QoS requirements may be accorded varying classifications. The established classifications may then form the basis for a packet scheduling system, as briefly set forth above. More specifically, the packet scheduling system may implement QoS on a per data unit (e.g., byte) basis. In one implementation consistent with principles of the invention, the packet scheduling system is a weighted round robin (WRR) scheduling system, such as that briefly described above. Additional information regarding the operation and functionality of the packet scheduling system will be described in additional detail below.

Figure 3:
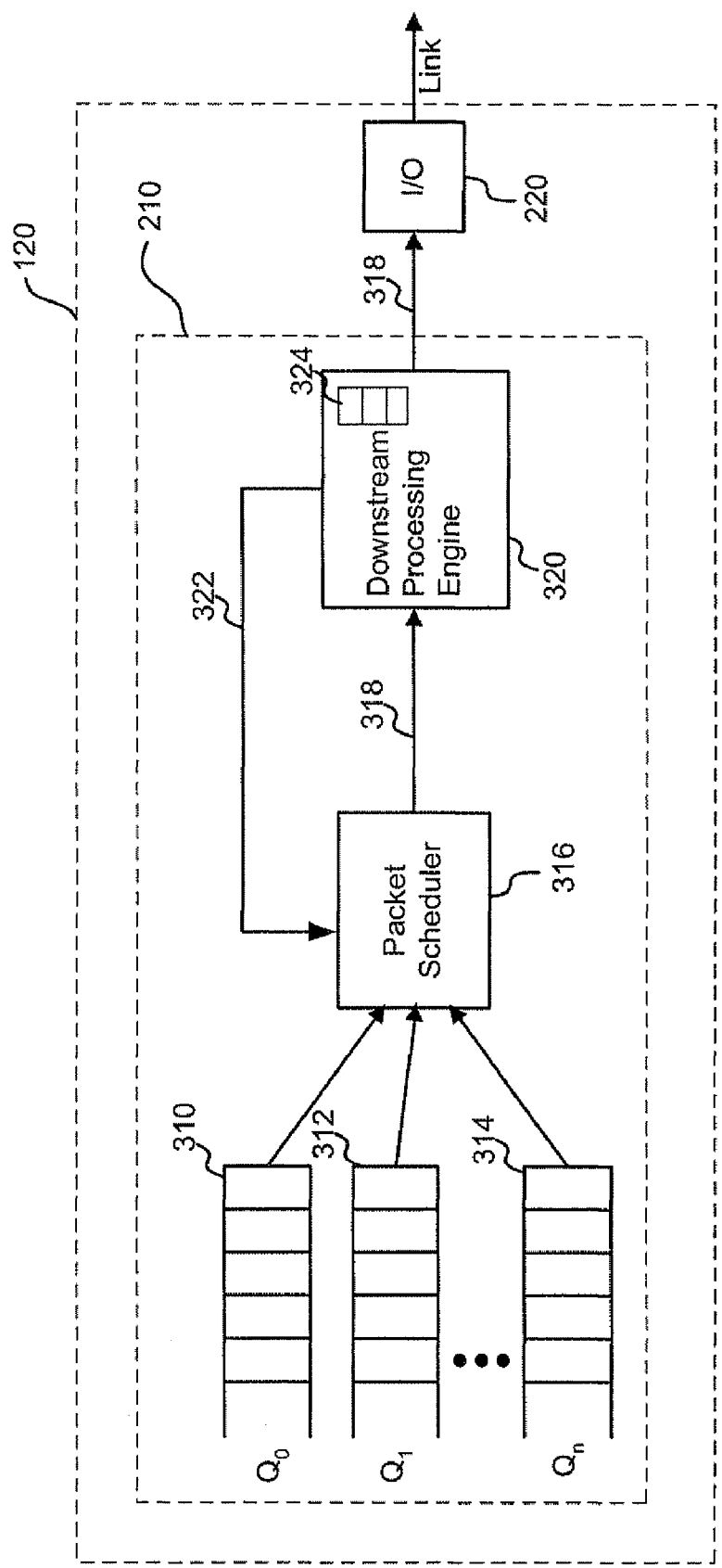
FIG. 3 is a diagram conceptually illustrating notification flow through a number of queues.

FIG. 3 is a functional block diagram of a PFE 120 according to an implementation consistent with principles of the invention. PFE 120 may include a packet processor 210 and I/O 220. Packet processor 210 may further include a set of output queues $Q_0$-$Q_n$ (310-314), a packet scheduler 316 operatively connected to queues 310-314, a downstream processing engine 320 operatively connected to packet scheduler 316, and a feedback path 322 between downstream processing engine 320 and packet scheduler 316.

As briefly set forth above, packet data flows through the queues $Q_0$-$Q_n$ (310-314), wherein each queue has been assigned a weight $w_0$-$w_n$ associated with its relative priority. A packet that reaches the head position in its queue 310-314 may be selected by packet scheduler 316. Packets selected by packet scheduler 316 for a particular group of queues are then assembled into a stream 318. Typically, stream 318 may correspond to a particular output port on one of I/Os 220. Each queue accordingly shares the bandwidth of the stream 318. Packet scheduler 316 may allow higher priority or more heavily weighted ones of queues 310-314 to use a greater portion of the bandwidth of stream 318 than lower priority queues. In this manner, packet scheduler 316 may control the flow of packets from its input.

Once output by packet scheduler 316, additional downstream processing is performed by downstream processing engine 320. In one implementation, the processing performed by downstream processing engine 320 results in bytes or other data units being either added or removed from a packet on stream 318. It should be understood that in operation, the actual processing performed by downstream processing engine 320 relates to frame/packet encapsulation, formatting packets into a desired format, fragmenting packets where necessary (i.e., taking one input packet and creating two discrete packets less than a predetermined size), stripping and applying header information, pushing/popping MPLS labels, etc. Each of these processing elements may result in the addition or removal of bytes from output stream 318. Additionally, although changes in packet byte length are disclosed herein, it should be understood that any suitable data unit may be used as the basis for the scheduling system.

Because packet scheduler 316 is initially unaware of packet size changes resulting from downstream processing, potential inaccuracies in the scheduling scheme may result. To remedy this effect, a feedback path 322 is provided between downstream processing engine 320 and packet scheduler 316. In one implementation consistent with principles of the invention, feedback path 322 delivers information from downstream processing engine 320 to packet scheduler 316 representing the net change in packet or frame size (e.g., $\Delta$=packet size in–packet size out) as well as an indication relating to which queue ($Q_0$-$Q_n$) from which the packet initiated. Packet scheduler 316 may then incorporate the received information into subsequent scheduling decisions to thereby improve the accuracy of the scheduling system and increase system performance. Additional details relating to the processing of downstream processing engine 320, feedback path 322 and packet scheduler 316 are set for in additional detail below.

In one implementation consistent with principles of the invention, I/Os 220 introduce additional downstream processing effects (i.e., changes to net packet or frame length) prior to outputting a stream on the physical link. To compensate for these effects, downstream processing engine 320 includes (or may access) a series of configurable registers 324 which contain estimated packet length change values for a variety of output streams. For example, where I/O 220 adds L1 packet overhead to the output stream, a change value from a configurable register reflecting the additional overhead bytes may be included in feedback path 322. For other output streams, predetermined inter-packet gaps may be required. For these streams, a predetermined number of bytes are added at I/O 220. In this case, a second change value from a second configurable register reflecting the additional bytes may be included in feedback path 322.

In one implementation consistent with principals of the invention, the configurable registers 324 are configured to include adjustment values that are an estimate of what I/O 220 would do to each packet (e.g., adjustments based upon L1 overhead, inter-packet gap creation, etc.). It should be understood that there may be several configurable registers, and the appropriate one is selected based on the processing done in engine 320. In the simplest case, there would be one configurable register per output stream. However, in alternate implementations, there may be configurable registers for each particular "flow" within a stream. In this implementation, a pointer to the "flow" is passed to the output processing engine 320 in the notification sent with the packet header. Note that even though the value is an estimate, it is more accurate to do this estimate after the output processing engine 320 has manipulated the packet, (in contrast to doing a similar estimate correction at the packet scheduler), since it accounts accurately for the actual L2 size and fragmentation.

Figure 4:
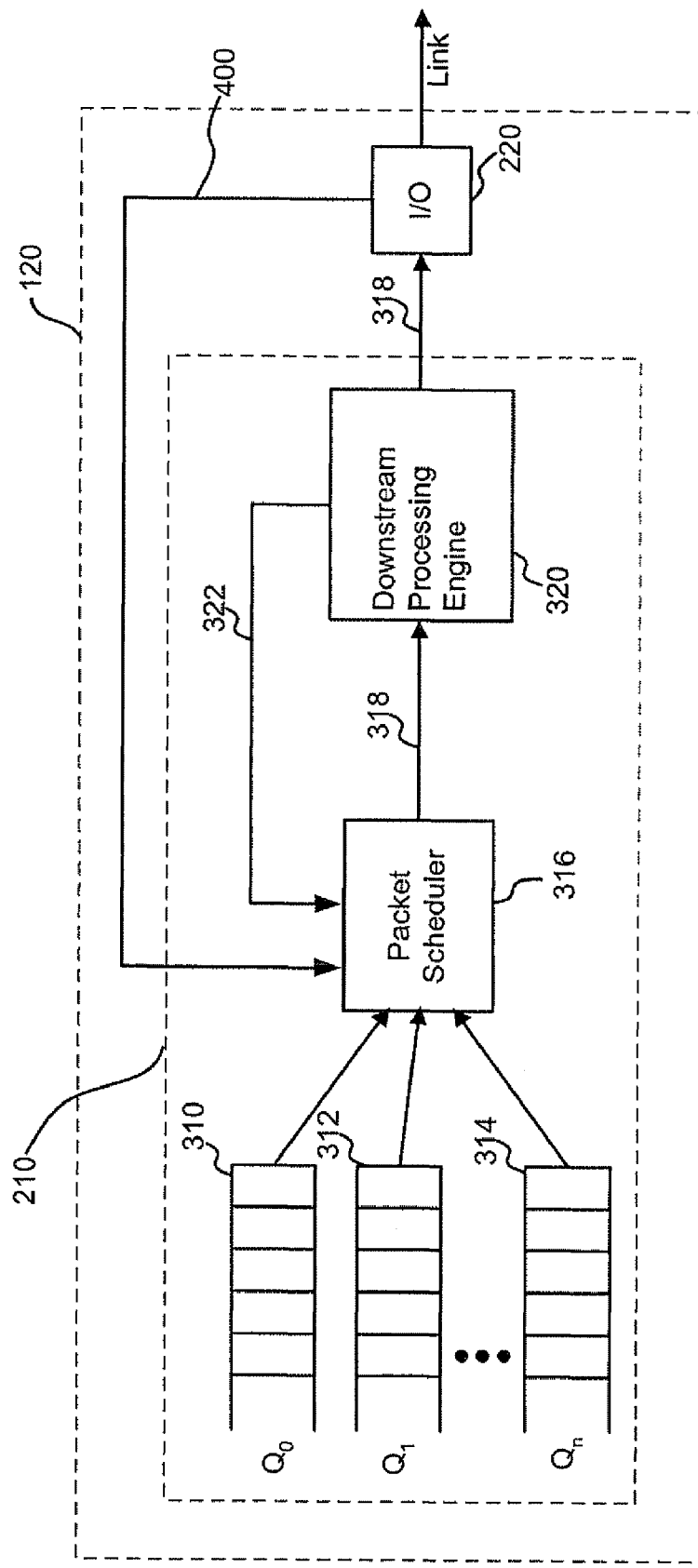
FIG. 4 is a diagram conceptually illustrating another implementation of data flow through a number of queues.

FIG. 4 is a functional block diagram of a PFE 120 according to an implementation consistent with principles of the invention. PFE 120 may include a packet processor 210 and I/O 220. Packet processor 210 may further include a set of output queues $Q_0$-$Q_n$ (310-314), a packet scheduler 316 operatively connected to queues 310-314, a downstream processing engine 320 operatively connected to packet scheduler 316, and a first feedback path 322 between downstream processing engine 320 and packet scheduler 316 and a second feedback path 400 between I/O 220 and packet scheduler 316.

In this implementation, feedback path 400 may deliver information from I/Os 220 to packet scheduler 316 representing the net change in packet or frame size resulting from processing at I/Os 220 as well as an indication relating to which queue ($Q_0$-$Q_n$) from which the packet initiated. As with feedback path 322, packet scheduler 316 may then incorporate the received information into subsequent scheduling decisions to thereby improve the accuracy of the scheduling system and increase system performance.

Exemplary Processing

As described above, packet scheduler 316 performs dequeing of the various PFE output queues based upon a preconfigured weighting methodology. Dequeued packets (or packet notifications) are then forwarded to downstream processing engine 320 and I/O 220 for eventual transmission on a physical link. In one implementation consistent with principles of the invention, packet scheduler 316 implements a weighted round robin (WRR) methodology for forwarding packets for transmission on a physical link.

Figure 5:
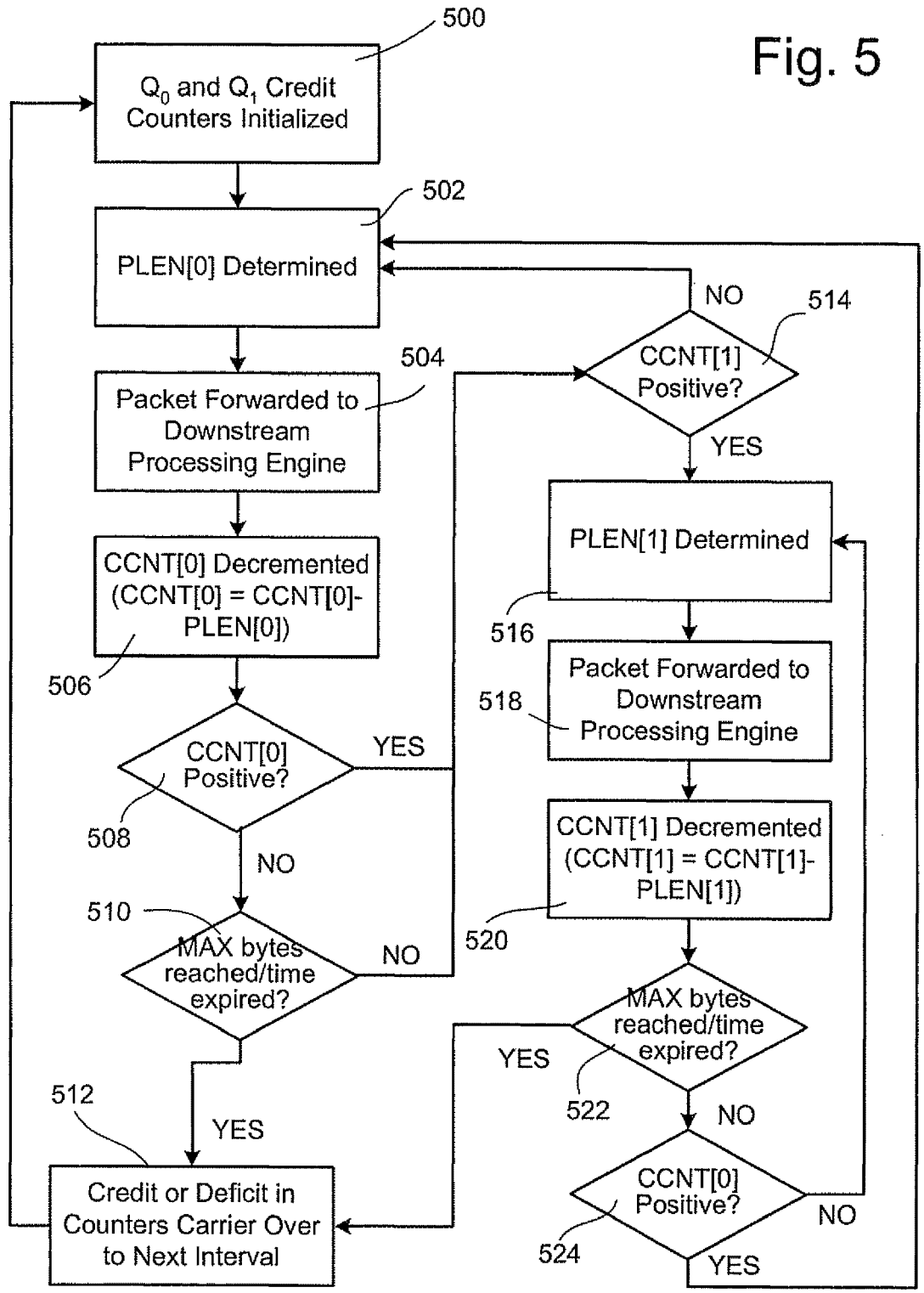
FIG. 5 is an exemplary flow diagram illustrating one implementation of a typical WRR methodology.

FIG. 5 is an exemplary flow diagram illustrating one implementation of a WRR methodology. For the sake of simplicity, the illustration of FIG. 5 is limited to two output queues $Q_0$ and $Q_1$ having relative weights of 70% and 30%, respectively. Further, an exemplary time interval of 10 ms is identified during which a predetermined maximum (MAX) number of bytes (e.g., 1000 bytes) are transmitted on the physical link. Each of the output queues then share the available bandwidth (bytes/interval or 1000 bytes/10 ms) based upon their respective weighting. For the above example, this would amount to 700 bytes/interval for $Q_0$ and 300 bytes/interval for $Q_1$. It should be understood that the number of output queues, as well as their relative weights are provided as examples only and may be manipulated in any desirable manner to meet the needs of the overall routing or forwarding system.

Processing begins with a packet scheduler initializing credit counters for $Q_0$ and $Q_1$ (act 500). For $Q_0$, initialization in our example means setting the counter equal to 700 bytes or 70% of the available bandwidth. For $Q_1$, the counter is set to 300 bytes or 30% of the available bandwidth. Next, the packet scheduler determines the size (PLEN[0]) of the next available packet in $Q_0$ (act 502). The packet is then forwarded to the downstream processing engine along with a queue identifier (act 504). The $Q_0$ credit counter (CCNT[0]) is then decremented by the size of the forwarded packet (CCNT[0]=CCNT[0]−PLEN[0]) (act 506). In one example, for a 40 byte packet, the $Q_0$ credit counter would be initially decremented from 700 to 660 bytes.

It is next determined whether CCNT[0]≧0 (act 508). If it is determined that CCNT[0] is negative (i.e., CCNT[0]<0), the packet scheduler next determines whether the maximum number of possible bytes has been transmitted (i.e., CCNT[0]+CCNT[1]≦0) or if the 10 ms time interval has expired (act 510). If not, the packet scheduler continues to act 514 (act 510) described in detail below. However, if it is determined that either has occurred, any deficit or credit to the credit counters of $Q_0$ and $Q_1$ are carried forward to the next interval by adding or subtracting the relevant byte counts to the newly initialized CNNT[0] or CCNT[1] (act 522). That is, for $Q_0$ this adjustment may be represented by the equation CNNT[0]=700+CNNT[0]. For $Q_1$ this adjustment may be represented by the equation CCNT[1]=300+CCNT[1]. This carrying forward is sometimes referred to as deficit round robin or DRR. In this manner, domination of the packet scheduler by long packets does not result in the long term disadvantage of the alternate queue(s).

If it is determined that either CCNT[0] is positive or that the maximum number of bytes has not been transmitted or that the time interval has not expired, the packet scheduler looks to queue $Q_1$ and determines whether its credit counter is less than or equal to zero (i.e., CCNT[1]≦0) (act 514). That is, it is determined whether $Q_1$ has used up its allotted proportion of bandwidth for a given time interval. If the $Q_1$ credit counter is less than or equal to zero, the scheduler returns to act 502 for the next packet in queue $Q_0$. However, if the $Q_1$ credit counter is greater than zero, the packet scheduler next determines the size (PLEN[1]) of the next available packet in $Q_1$ (act 516). The packet is then forwarded to the downstream processing engine along with a queue identifier (act 518). The $Q_1$ credit counter (CCNT[1]) is then decremented by the size of the forwarded packet (CCNT[1]=CCNT[1]−PLEN[1]) (act 520). The packet scheduler then determines again whether the maximum number of possible bytes has been transmitted or whether the 10 ms time interval has expired (act 522). If the maximum number of bytes has been transmitted or the time interval has expired, the packet scheduler proceeds to act 512 described above in carrying forward any credits or deficits to each queue's credit counters.

If the maximum numbers of bytes has not been forwarded or the 10 ms interval has not expired, the packet scheduler determines whether queue $Q_0$ has exhausted its available bandwidth as evidenced by a non-positive credit counter (act 524). If the CCNT[0] is positive, the packet scheduler returns to act 502 above for processing of the queue $Q_0$. However, if CCNT[0] is not positive, the system returns to act 516 for handing the next packet from queue $Q_1$.

In one implementation consistent with principles of the invention, queue priority may be additionally implemented into the scheduling methodology set forth above. In this manner, queues having higher priorities, regardless of relative weighting would remain active in the packet scheduler. Queues having identical priorities revert to the weighted round robin scheme set forth above. By providing a mechanism for fairly scheduling packet forwarding, WRR enables queues to share available bandwidth in an equitable manner.

Although WRR scheduling provides for fair forwarding of queued packets, byte length additions and subtractions which occur downstream of the packet scheduler may adversely impact the fairness of the scheduling system. Accordingly, above-described packet scheduling systems provide for a redress to these potential effects by enabling the packet scheduler to adjust queue credit counters for such downstream processing.

Figure 6:
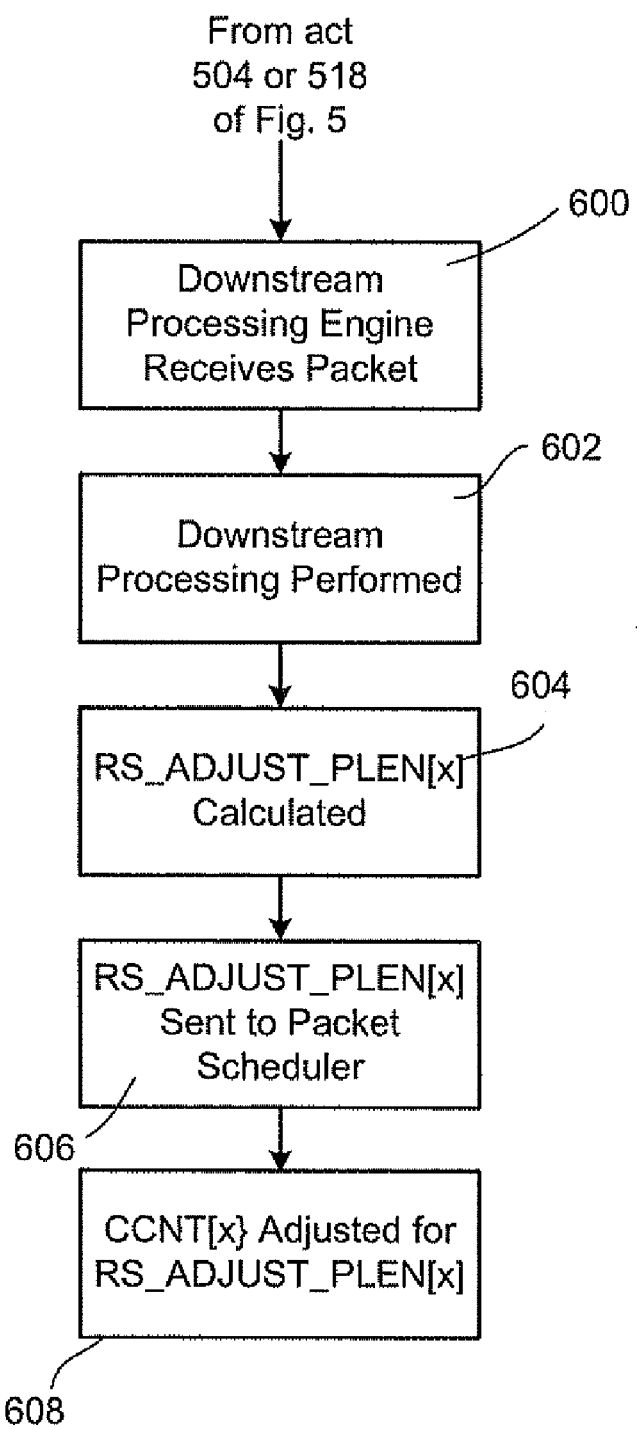
FIG. 6 is a flow diagram illustrating one implementation of a method for adjusting credit-based scheduling for downstream byte length changes.

FIG. 6 is a flow diagram illustrating one implementation of a method for adjusting credit-based scheduling for downstream byte length changes in accordance with the principles of the invention. Initially, downstream processing engine 320 receives a packet (or packet notification) from the packet scheduler 316 for transmission on the physical link (act 600). At this point, downstream processing is performed on the received packet (act 602). Such processing may include byte or header stripping, L3 and L2 encapsulation, fragmentation, MPLS label pushing/popping, etc. Regardless of the type or manner of processing performed, a net byte length change value (RS_ADJUST_PLEN[x], where x indicates the queue from which the current packet was received) is calculated which reflects the overall change in packet length as output from downstream processing engine 320 compared to the packet output from packet scheduler 316 (act 604).

Next, the RS_ADJUST_PLEN[x] value is sent to packet scheduler 316 via feedback path 322 (act 606). Once received by the packet scheduler 316, the credit counter for the associated queue [x] is decremented or increased by the value associated with RS_ADJUST_PLEN[x] (i.e., CCNT[X]= CCNT[x]−RS_ADJUST_PLEN[x]) (act 608). Accordingly, for packets having a net negative change (i.e., the resulting packet is smaller than that initially forwarded by scheduler 316), the credit counter is incremented, thereby enabling higher bandwidth consumption for subsequent packets. For packets having a net positive change (i.e., the resulting packet is larger than that initially forwarded by scheduler 316), the credit counter is decremented, thereby enabling less bandwidth consumption for subsequent packets.

Figure 7:
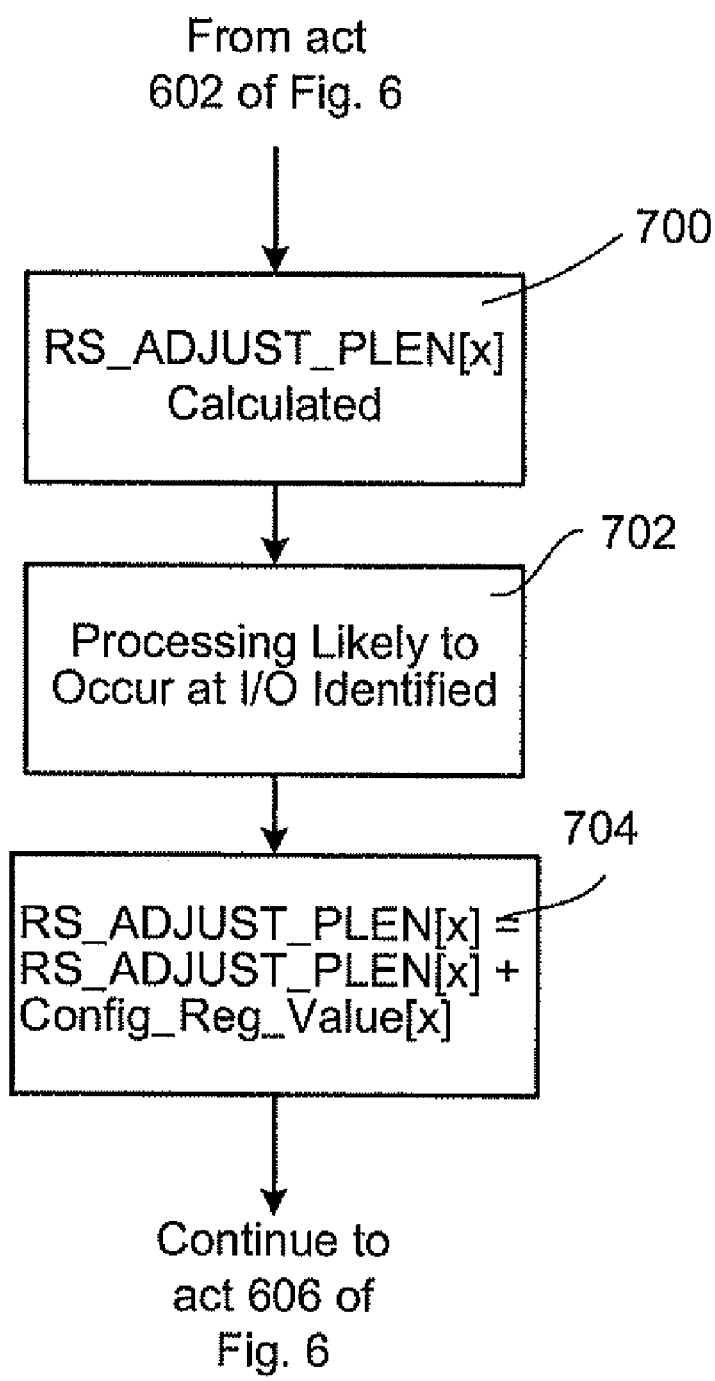
FIG. 7 is a flow diagram illustrating one method for accounting for additional packet length changes prior to output on a physical link.

As briefly discussed above, processing by I/Os 220, downstream of downstream processing engine 320, may result in additional bytes being added or removed from the outgoing packet prior to its transmission on the physical link. FIG. 7 is an exemplary flow diagram illustrating one method for accounting for these additional bytes. Initially, from act 602 above, the net packet length change (RS_ADJUST_PLEN[x]) at downstream processing engine 320 is calculated (act 700). Next, processing likely to occur at I/O 220 is identified (act 702). For example, I/O 220 may add L1 packet overhead to the output stream, predetermined inter-packet gaps may be added, or minimum frame size requirements may need to be satisfied. As described above, change values reflecting net packet length change in view of each processing scenario may be maintained in associated configurable registers 324 (FIG. 3) in downstream processing engine 320. Based on the likely processing identified in act 702, a change value from an associated configurable register may be included within RS_ADJUST_PLEN[x] (i.e., RS_ADJUST_PLEN[x]=RS_ADJUST_PLEN[x]+Config_Reg_Value) (act 704). The process then continues to act 606 above, where RS_ADJUST_PLEN[x] is sent to packet scheduler 316.

Figure 8:
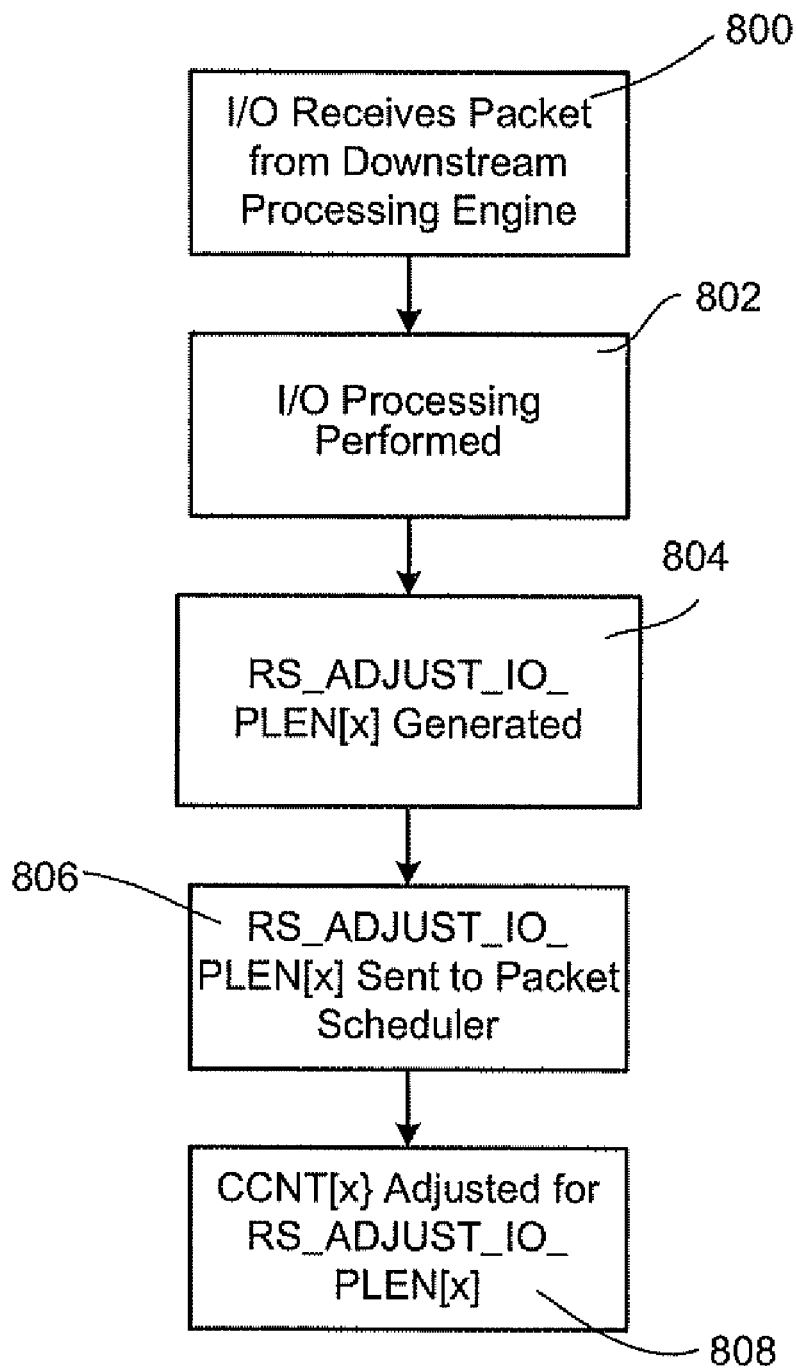
FIG. 8 is a flow diagram illustrating a second method for accounting for additional packet length changes prior to output on a physical link.

FIG. 8 is an exemplary flow diagram illustrating an additional implementation of a method for accounting for these additional bytes consistent with principles of the invention. Initially, following act 606 above, I/O 220 receives a packet from the downstream processing engine 320 for transmission on the physical link (act 800). At this point any I/O processing is performed on the received packet (act 802). Such processing may include L1 overhead processing, inter-packet gap processing, minimum frame size processing, etc. Regardless of the type or manner of processing performed, an I/O net byte length change value (RS_ADJUST_IO_PLEN[x], where x indicates the queue from which the current packet was received) is generated which reflects the overall change in packet length as output from I/O 220 compared to the packet output from downstream processing engine 320 (act 804).

Next, the RS_ADJUST_IO_PLEN[x] value is sent to packet scheduler 316 via second feedback path 400 (FIG. 4) (act 806). Once received by the packet scheduler 316, the credit counter for the associated queue [x] is decremented or increased by the value associated with both RS_ADJUST_PLEN[x] and RS_ADJUST_IO_PLEN[x] (i.e., CCNT[x]= CCNT[X]−RS_ADJUST_PLEN[x]−RS_ADJUST_IO_PLEN[x]) (act 808). Accordingly, for packets having a net negative change (i.e., the resulting packet is smaller than that initially forwarded by scheduler 316), the credit counter is incremented, thereby enabling higher bandwidth consumption for subsequent packets. For packets having a net positive change (i.e., the resulting packet is larger than that initially forwarded by packet scheduler 316), the credit counter is decremented, thereby enabling less bandwidth consumption for subsequent packets.

CONCLUSION

Implementations consistent with principles of the invention provide for improved scheduling in routing devices that accounts for many different forms of packet processing prior to output on a physical link. More particularly, a feedback path is provided between a packet scheduler and a downstream processing engine, for returning information regarding any change in output packet length. As a result, more accurate scheduling may be performed.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while a series of acts has been disclosed with regard to FIGS. 5-8 the order of the acts may be varied in other implementations consist with the present invention. Furthermore, non-dependent acts may be implemented in parallel.

It will also be apparent to one of ordinary skill in the art that aspects of the invention, as described above, may be implemented in may different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or be referred to as an "engine" that performs one or more functions. This logic/engine may include hardware, such as an application specific integrated circuit (ASIC) or a field programmable gate array, software, or a combination of hardware and software. While aspects have been described in terms of processing packet or packet data, these aspects may operate upon any type or form of data, including packet data and non-packet data. The term "data unit" may refer to packet or non-packet data.

No element, act or instruction used in description of the present invention should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:
1. A processor for a routing system, comprising:
a scheduler to perform scheduling on a per-packet basis;
a downstream processing engine, operatively connected to the scheduler, to receive a packet from the scheduler; and
a feedback path operatively connected between the downstream processing engine and the scheduler for returning information regarding a change in a packet byte length between an input and an output of the downstream processing engine.

2. The system of claim 1, where the scheduling includes quality of service (QoS) scheduling.

3. The system of claim 1, where the scheduling includes weighted round robin scheduling.

4. The system of claim 1, where the downstream processing engine is to perform one or more of:
    encapsulation processing on the received packet,
    fragmentation processing on the received packet, or
    Multiprotocol Label Switching (MPLS) label pushing/popping processing on the received packet.

5. The system of claim 1, where the scheduler incorporates the information regarding the change in the packet byte length into subsequent scheduling decisions.

6. The system of claim 1, further comprising:
    an input/output interface (I/O) operatively connected to the downstream processing engine to receive the packet from the downstream processing engine and transmit the packet on a physical link, where
    the I/O processes the packet for transmission on the physical link; and
    a second feedback path is operatively connected between the I/O and the packet scheduler to transmit a information reflecting a change in byte length of the packet between an input of the I/O and an output of the I/O.

7. The system of claim 1, further comprising:
    an input/output interface (I/O) operatively connected to the downstream processing engine to receive the packet from the downstream processing engine and transmit the packet on a physical link, where
    the I/O processes the packet for transmission on the physical link;
    the downstream processing engine includes a configurable register for maintaining estimated packet change values; and
    the net packet change value further includes at least one estimated packet change value based upon estimated packet change between the output of the downstream processing engine and an output of the I/O.

8. A method for transmitting data units, comprising:
    initializing a credit counter associated with an output queue;
    forwarding a data unit from the output queue to a downstream processing engine, the data unit having an initial data unit length;
    decrementing the credit counter by the initial data unit length;
    receiving, from the downstream processing engine and over a feedback path, a net data unit change value reflecting a changed data unit size between an output of the scheduler and an output of the downstream processing engine; and
    modifying the credit counter associated with the output queue by the net data unit change value.

9. The method of claim 8, where the data unit is a packet.

10. The method of claim 8, where the downstream processing includes encapsulation processing.

11. The method of claim 8, where the downstream processing includes fragmentation processing.

12. The method of claim 8, where the downstream processing includes Multiprotocol Label Switching (MPLS) label pushing/popping.

13. The method of claim 8, where the net data unit change value further comprises an estimated change value associated with processing at an input/output interface (I/O) operatively connected to the downstream processing engine.

14. The method of claim 8, further comprising:
    receiving, from the downstream processing engine and over another feedback path, a second net data unit change value reflecting changed data unit size between an output of the downstream processing engine and an output of an input/output interface (I/O) operatively connected to the downstream processing engine; and
    modifying the credit counter associated with the output queue by the second net data unit change value.

15. The method of claim 8, where the forwarding is based on scheduling that includes one or more of:
    quality of service (QoS) scheduling, or
    weighted round robin scheduling.

16. The method of claim 8, further comprising:
    applying the modified credit counter value into subsequent scheduling decisions.

17. The method of claim 8, further comprising:
    retrieving the data unit from a packet forwarding engine (PFE) output queue based on a weighted methodology.

18. One or more non-transitory computer-readable media storing instructions executable by one or more processors of a network device, the media storing one or more instructions for:
    initializing a credit counter associated with an output queue;
    forwarding a data unit from the output queue to a downstream processing engine, the data unit having an initial data unit length;
    decrementing the credit counter by the initial data unit length;
    receiving, from the downstream processing engine and over a feedback path, a net data unit change value reflecting a changed data unit size between an output of the scheduler and an output of the downstream processing engine; and
    modifying the credit counter associated with the output queue by the net data unit change value.

19. The media of claim 18, further storing one or more instructions for:
    receiving, a second net data unit change value reflecting a changed data unit size between an output of the downstream processing engine and an output of an input/output interface (I/O) operatively connected to the downstream processing engine; and
    modifying the credit counter associated with the output queue by the second net data unit change value.

20. The media of claim 18, further storing one or more instructions for:
    retrieving the data unit from a packet forwarding engine (PFE) output queue based on a weighted methodology.

* * * * *